US010829074B2

(12) United States Patent
Jacobson

(10) Patent No.: US 10,829,074 B2
(45) Date of Patent: Nov. 10, 2020

(54) KNEE AIRBAG ASSEMBLIES

(71) Applicant: Autoliv ASP, Inc., Ogden, UT (US)

(72) Inventor: James Ernie Jacobson, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 148 days.

(21) Appl. No.: 16/114,026

(22) Filed: Aug. 27, 2018

(65) Prior Publication Data

US 2020/0062206 A1 Feb. 27, 2020

(51) Int. Cl.
| | |
|---|---|
| *B60R 21/201* | (2011.01) |
| *B60R 21/2338* | (2011.01) |
| *B60R 21/206* | (2011.01) |
| *B60R 21/231* | (2011.01) |
| *B60R 21/217* | (2011.01) |
| *B60R 21/00* | (2006.01) |

(52) U.S. Cl.
CPC ........ *B60R 21/206* (2013.01); *B60R 21/2171* (2013.01); *B60R 21/231* (2013.01); *B60R 21/2338* (2013.01); *B60R 21/201* (2013.01); *B60R 21/2176* (2013.01); *B60R 2021/0051* (2013.01); *B60R 2021/2178* (2013.01); *B60R 2021/23169* (2013.01); *B60R 2021/23386* (2013.01)

(58) Field of Classification Search
CPC . B60R 21/2176; B60R 21/206; B60R 21/201; B60R 21/231; B60R 21/217; B60R 21/2338; B60R 21/23386; B60R 21/2171; B60R 21/215; B60R 2021/0051; B60R 2021/23169; B60R 2021/2178; B60R 2021/23386; B60R 2021/2172

USPC ......... 280/743.1, 728.2, 743.2, 732
See application file for complete search history.

(56) References Cited

U.S. PATENT DOCUMENTS

| | | | |
|---|---|---|---|
| 6,702,318 B2 * | 3/2004 | Rose | B60R 21/217 |
| | | | 280/728.2 |
| 9,205,797 B2 * | 12/2015 | Ostman | B60R 21/201 |
| 2005/0225059 A1 | 10/2005 | Lewis et al. | |
| 2007/0063490 A1 | 3/2007 | Minamikawa | |
| 2008/0217892 A1 | 9/2008 | Maripudi et al. | |
| 2008/0284142 A1 | 11/2008 | Cheal et al. | |
| 2010/0052295 A1 | 3/2010 | Fukawatase et al. | |
| 2012/0001405 A1 | 1/2012 | Kim | |
| 2013/0113190 A1 | 5/2013 | Schneider et al. | |
| 2014/0375024 A1 | 11/2014 | Osterfeld | |
| 2015/0115580 A1 | 4/2015 | Gould et al. | |

OTHER PUBLICATIONS

International Search Report and Written Opinion dated Nov. 4, 2019 for international application PCT/US2019/045637.

* cited by examiner

*Primary Examiner* — Keith J Frisby
(74) *Attorney, Agent, or Firm* — Stoel Rives LLP

(57) ABSTRACT

An inflatable knee airbag having a flexible housing is disclosed. An inflatable knee airbag may provide protection for the lower anatomy of an occupant in a vehicle collision event. The disclosed inflatable knee airbag may include components, such as the inflatable airbag cushion, inflator, etc., within a flexible housing supported by a rigid or semi-rigid mounting plate. The flexible housing may conform to the shape of enclosed components, and may support and protect the enclosed components. The flexible housing may be lighter and more cost-effective than conventional housing methods.

16 Claims, 11 Drawing Sheets

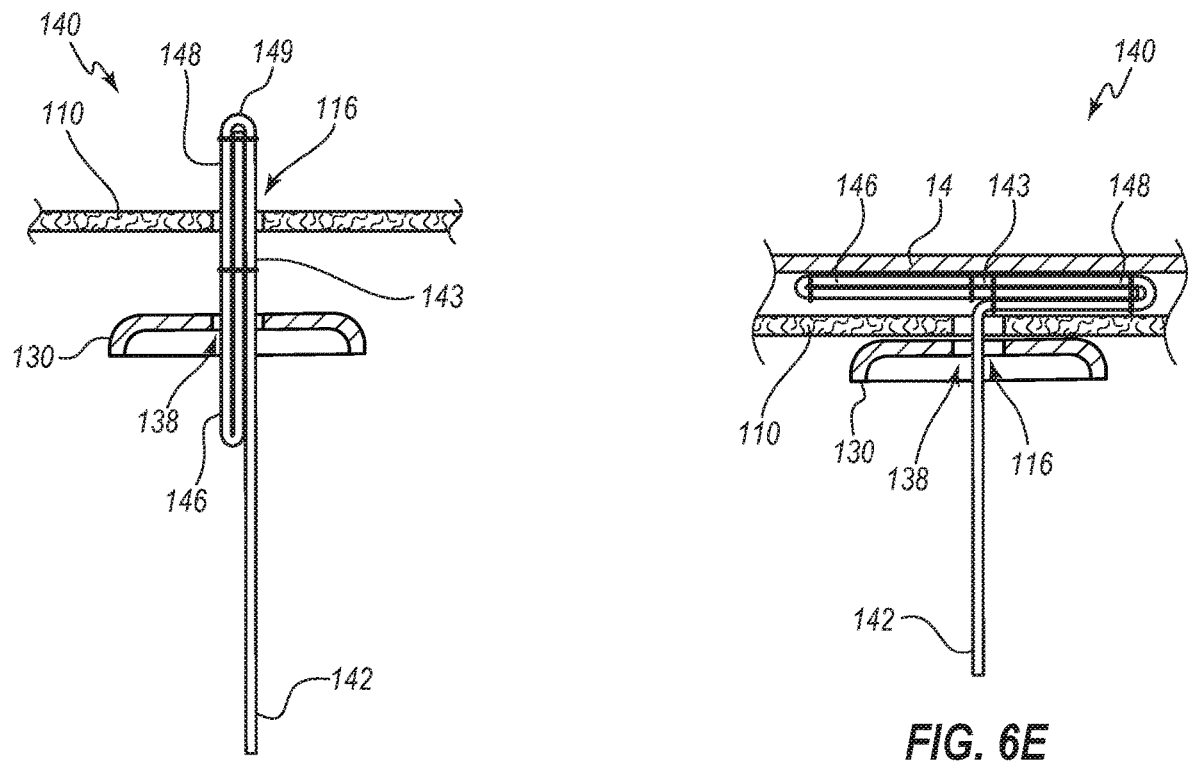
FIG. 6D
FIG. 6E
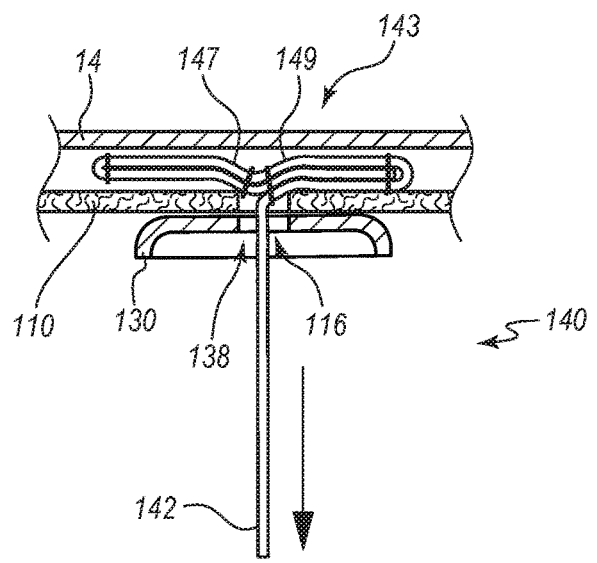
FIG. 6F

KNEE AIRBAG ASSEMBLIES

TECHNICAL FIELD

The present disclosure relates generally to the field of protection systems for vehicle occupants. More particularly, the present disclosure relates to airbag assemblies, such as inflatable knee airbag assemblies having a flexible housing and configured to deploy in response to a collision event.

BACKGROUND

Protection systems have been installed in vehicles to protect occupants during collision events. Some protection systems suffer from one or more drawbacks or may perform less than optimally in one or more respects. Certain embodiments disclosed herein can address one or more of these issues.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 6D is a side view of the tab of FIG. 6A as it is being inserted into a mounting plate and a flexible housing.

FIG. 6E is a side view of the tab of FIG. 6A coupled to the mounting plate and the flexible housing of FIG. 6C.

FIG. 6F is a side view of the tab of FIG. 6A when the airbag assembly is in a deployed state.

DETAILED DESCRIPTION

Figure 1:
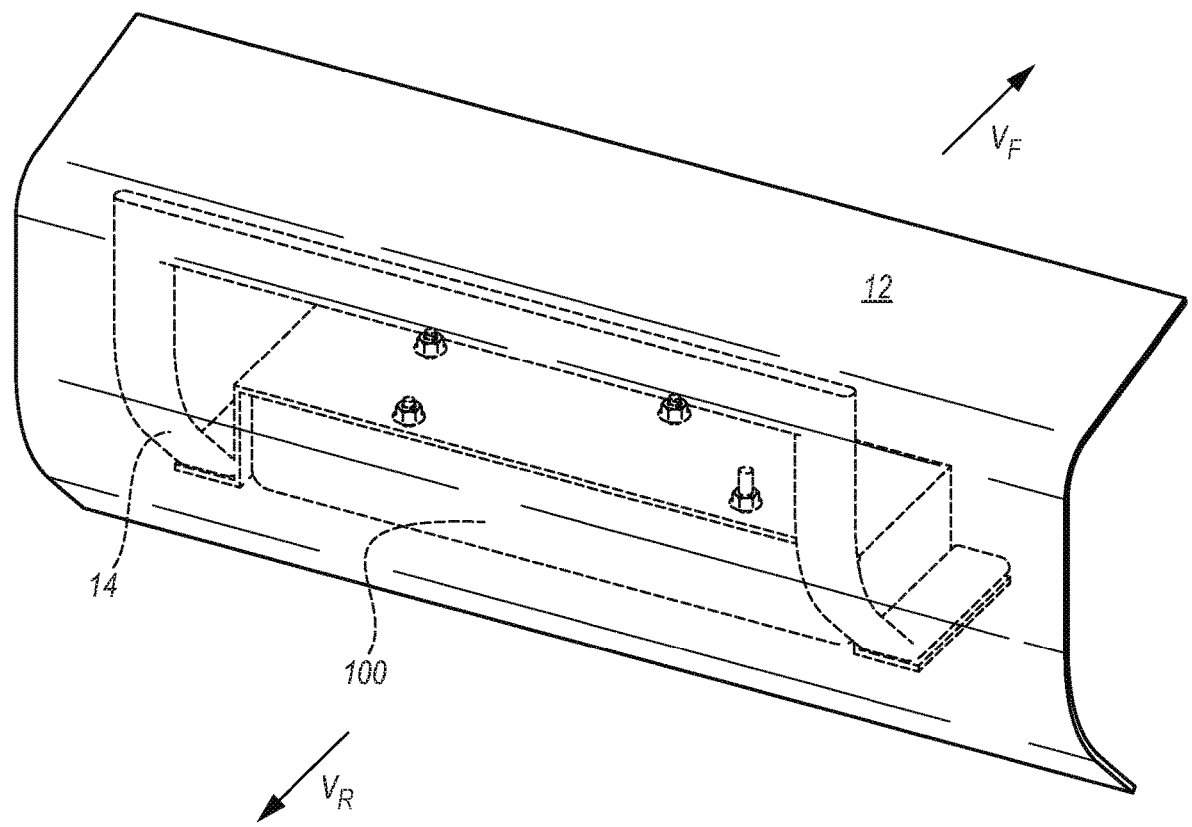
FIG. 1 is a perspective view of a portion of an instrument panel and/or dashboard of a vehicle to which is coupled an airbag assembly according to an embodiment of the present disclosure.

Occupant protection systems, such as airbag assemblies, may be installed at various locations within a vehicle to reduce or minimize occupant injury during a collision event. In the following disclosure, specific reference is made to airbag assemblies that are designed to deploy in the direction of a knee area of an occupant seated in a vehicle seating position, although the principles discussed herein may apply to other types of airbag assemblies that are designed to cushion other portions of an occupant.

Airbag assemblies generally include an airbag cushion. The airbag cushion is typically disposed within a housing in a packaged state (e.g., rolled, folded, and/or otherwise compressed) and may be retained in the packaged state behind a cover. During a collision event, an inflator may be triggered, which rapidly supplies the airbag cushion with inflation gas. The inflation gas may cause the airbag cushion to rapidly transition from a compactly packaged (i.e., undeployed) state to an expanded or deployed state. In some embodiments, the expanding airbag cushion opens an airbag cover (e.g., by tearing through a predefined tear seam or opening a door-like structure) to exit the housing. The inflator may be triggered by any suitable device or system, and the triggering may be in response to and/or influenced by one or more vehicle sensors.

Airbag assemblies may include a knee restraint or knee airbag to protect the knees and/or lower legs of an occupant during a collision event. Such knee restraints may absorb at least some of the impact energy of an occupant during a collision event, especially by restraining the lower torso by means of restraining or limiting the forward movement (or forward diagonal movement) of the knees. In some embodiments, the knee restraint may comprise an airbag cushion that contacts and cushions the knees of an occupant during a collision event.

Some embodiments of airbag assemblies disclosed herein may be useful for protecting occupants seated in a front seat of a vehicle. Other embodiments of the airbag assemblies disclosed herein may be particularly useful for protecting occupants who are seated rearward of the front seats of a vehicle.

For example, in some embodiments, the airbag assemblies include an airbag cushion that is deployed from a position immediately in front of the occupant at a relatively low position. For instance, the airbag cushion may deploy from an instrument panel or a seat back at a position that is level with or lower than the position of the knees of an occupant who is seated in a front or back seat.

The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated.

The term "coupled to" is used in its ordinary sense, and is broad enough to refer to any suitable coupling or other form of interaction between two or more entities, including mechanical interactions. Two components may be coupled to each other even though they are not in direct contact with each other. "Attachment" refers to interaction between two or more entities that are in direct contact with each other and/or are separated from each other only by a fastener of any suitable variety (e.g., mounting hardware or an adhesive).

As used herein, the terms "forward" and "rearward" are used with reference to the front and back of the relevant vehicle. For example, an airbag cushion that deploys in a rearward direction deploys toward the back of a vehicle.

The directional terms "proximal" and "distal" are used herein to refer to opposite locations on an airbag cushion. The proximal end of an airbag cushion is the end of the airbag cushion that is closest to the inflator when the airbag cushion is fully inflated. The distal end of an airbag cushion is the end opposite the proximal end of the airbag cushion. In other words, the terms "proximal" and "distal" are with reference to a point of attachment, such as a point of attachment of the airbag cushion at an airbag assembly housing and a point of attachment of an airbag assembly at a seat back from which an airbag deploys. Specifically, "proximal" is situated toward such point of attachment and "distal" is situated away from such point of attachment.

The term "seat," as used herein, refers to a structure within the cabin of a vehicle installed such that an occupant may be seated thereon/therein for transport within the vehicle.

A "vehicle seating position" may be defined by a seat (e.g., a front passenger seat, a front driver seat, a back seat) of a vehicle. A vehicle seating position may be the position in which an occupant is generally positioned when seated in a seat of a vehicle. A vehicle seating position may also be a position in which an occupant may be seated prior to and/or during a collision event or a position in which the vehicle and/or the seat is designed to transport an occupant.

The term "vehicle" may refer to any vehicle, such as a car, truck, bus, airplane, etc.

The term "occupant" generally refers to a person within a vehicle. The term "occupant" can also include a crash test dummy within a vehicle.

FIG. 1 is a perspective view of a portion of an instrument panel 12 (e.g. dashboard) of a vehicle and an airbag assembly 100 coupled to the instrument panel 12 according to an embodiment of the present disclosure. Arrows representing a vehicle forward direction $V_F$ and a vehicle rear direction $V_R$ are shown for reference in FIG. 1 and various other figures. The airbag assembly 100 of the present disclosure may be a knee inflatable airbag assembly or any other suitable airbag assembly. A support member 14 may be integral with the instrument panel 12 and may be coupled to the instrument panel 12 of the vehicle. The airbag assembly 100 may be coupled to the support member 14, as further described herein.

Figure 2:
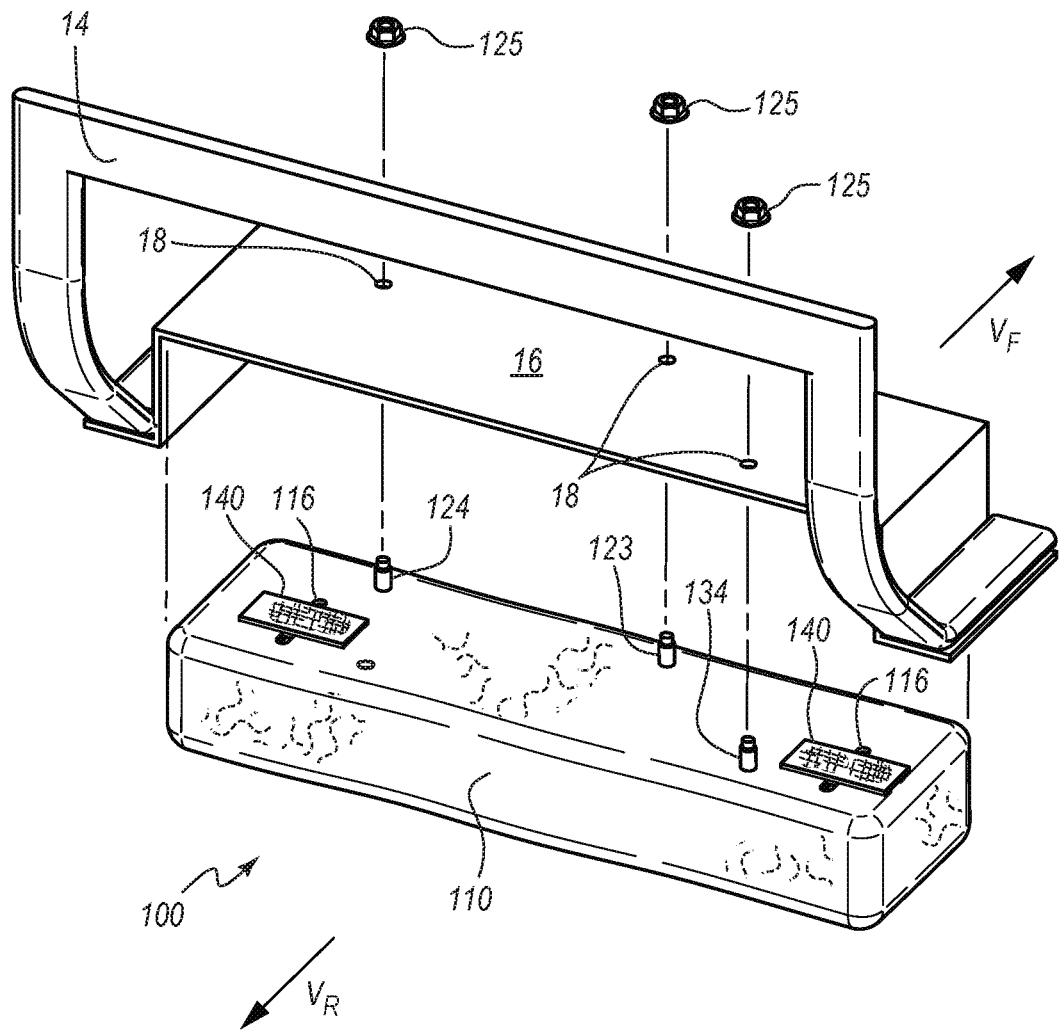
FIG. 2 is a partially exploded view of the airbag assembly and support member of FIG. 1.

FIG. 2 is a partially exploded view of the airbag assembly 100 and support member 14 of FIG. 1. An airbag assembly receiver 16 of the support member 14 may be configured to accommodate the airbag assembly 100. The airbag assembly receiver 16 of the support member 14 may comprise at least three attachment apertures 18 for coupling the airbag assembly 100 to the support member 14.

Figure 3:
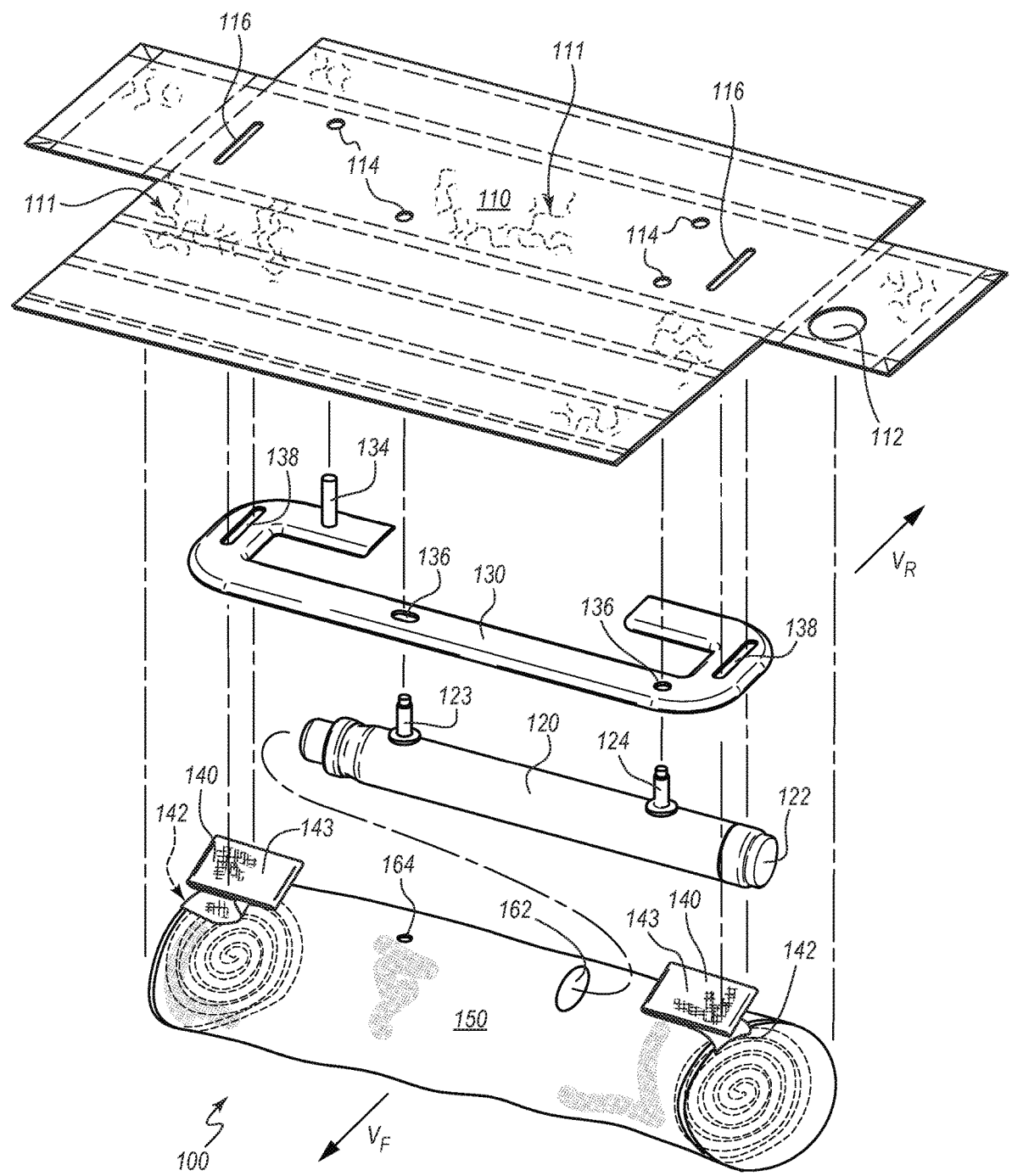
FIG. 3 is a partially exploded view of the airbag assembly of FIGS. 1-2, according to an embodiment of the present disclosure.

The airbag assembly 100 may comprise a flexible housing 110, an inflator (not shown, but see, e.g., 120 in FIG. 3), and an inflatable airbag cushion (see 150 in FIG. 3). The flexible housing 110 may comprise at least two tab slots 116 for receiving tabs 140 that are coupled to the inflatable airbag cushion 150.

A plurality of attachment studs 123, 124, 134 may protrude from (or through) the flexible housing 110. The studs 123, 124, 134 may each pass through a corresponding attachment aperture 18 of the airbag assembly receiver 16. Each stud 123, 124, 134, may be secured to the airbag assembly receiver 16 by means of securing hardware 125. Exemplary securing hardware 125 may include, without limitation, nuts, speed nuts, push nuts, etc., and may be used to affix the studs 123, 124, 134 to the airbag assembly receiver 16.

Each tab 140 may be coupled to the airbag cushion (150 in FIGS. 7-8) and pass through the corresponding tab slot 116 of the flexible housing 110. The support member 14 may serve as a reaction surface for the airbag assembly 100. In other words, the airbag assembly 100 may be coupled to a reaction surface comprising a support member 14 of the vehicle. More particularly, the airbag assembly receiver 16 may serve to anchor the deployed airbag assembly 100 during a collision event, including engagement by an occupant and through ride down.

FIG. 3 is a partially exploded view of the airbag assembly 100 of FIGS. 1-2, according to an embodiment of the present disclosure. The inflatable airbag cushion 150, the inflator 120, and a mounting plate 130 may be disposed within the flexible housing 110.

Figure 4:
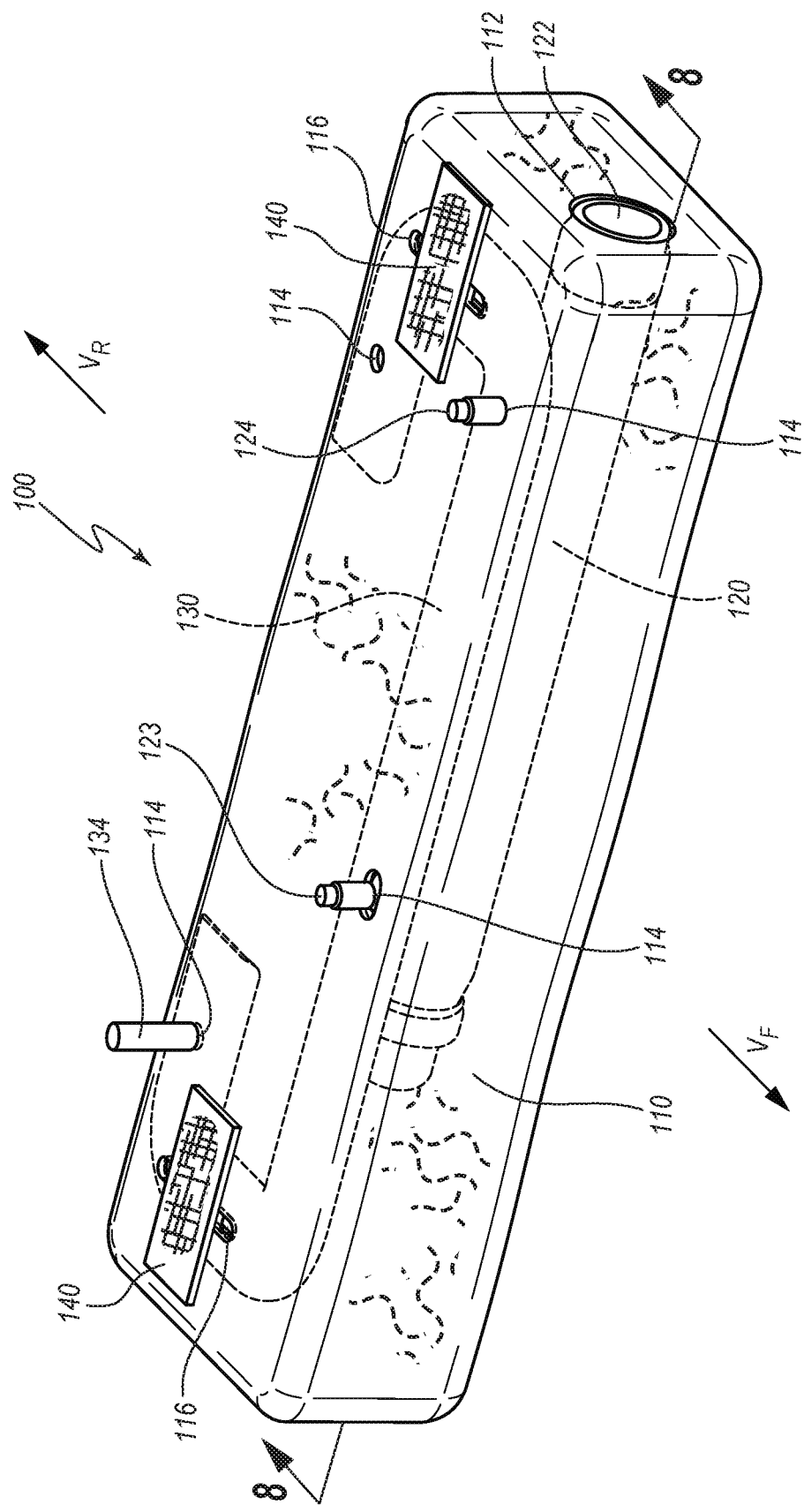
FIG. 4 is a perspective view of an assembled airbag assembly of FIGS. 1-3.

The flexible housing 110 may comprise a ductile fabric material including a plurality of polymeric fibers 111 in which at least some of the polymeric fibers 111 may be fused together by simultaneously heating and applying pressure to impart a particular stable shape. The shape may be a predetermined shaped. FIG. 4 illustrates the polymeric fibers 111 fused together to form a shape that conforms to the airbag assembly 100 in a compressed state. Possible shapes may include a generally rectangular shape, ovoid, obround, triangular, etc. The inflatable airbag cushion 150, in an uninflated state, may be assembled with the inflator 120, the mounting plate 130, and tabs 140, etc., and compressed, then wrapped with the initially ductile fabric (e.g., initially flexible cover), forming an intermediate package. The airbag assembly 100 may then be subjected to an appropriate amount of heat and pressure so as to conform the ductile fabric to the shape of the compressed inflatable airbag cushion/inflator/tabs 150/120/140, and to fuse together at least some of the fibers 111 of the ductile fabric to retain the shape achieved during the heat fusing process, forming a compressed package. After the fusing process, the flexible housing 110 may attain a rigid, semi-rigid, or quasi-rigid state. The flexible housing 110 may both support the airbag assembly 100 and protect the airbag assembly 100 from exposure to a local environment (such as, for example, dust, mud, etc.).

The inflator 120 comprises the inflator connector end 122, a first stud 123, and a second stud 124. The inflator 120 may comprise more or less than the illustrated two studs 123, 124. The inflator 120 may be partially inserted into the inflatable airbag cushion 150 via an inflator aperture 162 such that at least the inflator connector end 122 remains exposed outside the airbag cushion 150. The inflator aperture 162 may be configured to accommodate passage of the first stud 123 into the inflatable airbag cushion 150. The first stud 123 may then be passed through an inflator stud aperture 164 of the inflatable airbag cushion 150. In some embodiments, both the first stud 123 and the second stud 124 may pass through apertures in the inflatable airbag cushion 150.

The mounting plate 130 may comprise an elongate member having at least two stud apertures 136, two tab slots 138, and at least one stud 134. The mounting plate 130 may include more or fewer than two stud apertures 136 and two tab slots 138. Once the inflator 120 is inserted into the inflatable airbag cushion 150, the studs 123, 124 may pass through the corresponding stud apertures 136 of the mounting plate 130. Each tab 140 may comprise a first end 142 and a second end 143. The second end 143 of each tab 140 may pass through the corresponding tab slot 138 of the mounting plate 130. With the inflatable airbag cushion 150 and inflator 120 assembled to the mounting plate 130, the studs 123, 124, 134 and the second ends 143 of the tabs 140 may pass through the corresponding stud apertures 114 and tab slots 116 of the flexible housing 110.

In some embodiments, assembly of the inflatable airbag cushion 150, inflator 120, and mounting plate 130 to the flexible housing 110 may be accomplished prior to a forming/fusing process to give the flexible housing 110 a shape. In one embodiment, the flexible housing 110 may not have the tab slots 116, and the second end 143 of each tab 140 may, in the assembled airbag assembly 100 may be disposed between the mounting plate 130 and an interior upper surface of the flexible housing 110.

In some embodiments, the inflatable airbag cushion 150, inflator 120, and mounting plate 130 may be disposed in the flexible housing 110 such that the inflator connector end 122 is exposed at or through an inflator connector aperture 112. In other words, prior to the application of heat and/or pressure to impart a preferred form to the flexible housing 110, the flexible housing 110 may be folded or otherwise manipulated to ensure that the inflator connector end 122 is exposed at or protrudes through the inflator connector aperture 112 of the flexible housing 110.

Prior to assembly, the inflatable airbag cushion 150 may be rolled or folded into a compact state, as shown in FIG. 3. Although the inflatable airbag cushion 150 is shown rolled, the present disclosure anticipates other methods of compacting the inflatable airbag cushion 150, such as, e.g., rolling, folding, etc. The first end 142 of each tab 140 may be coupled to the inflatable airbag cushion 150 so as to assist in properly disposing the inflatable airbag cushion 150 during deployment.

FIG. 4 is a perspective view of the assembled airbag assembly 100 of FIGS. 1-3. The mounting plate 130 and inflator 120 are shown assembled to and within the flexible housing 110. The inflator connector end 122 is shown exposed through the inflator connector aperture 112 of the flexible housing 110. The inflator studs 123, 124 and mounting plate stud 134 each protrude through a corresponding stud aperture 114 of the flexible housing 110. The tabs 140 are each shown having been passed through a corresponding tab slot 116 of the flexible housing 110. Each of the studs 123, 124, 134 is oriented in the same direction and orthogonal to the mounting plate 130. In one embodiment, the studs 123, 124, 134 may be oriented in differing directions and/or may be other than orthogonal to the mounting plate 130.

Figure 5:
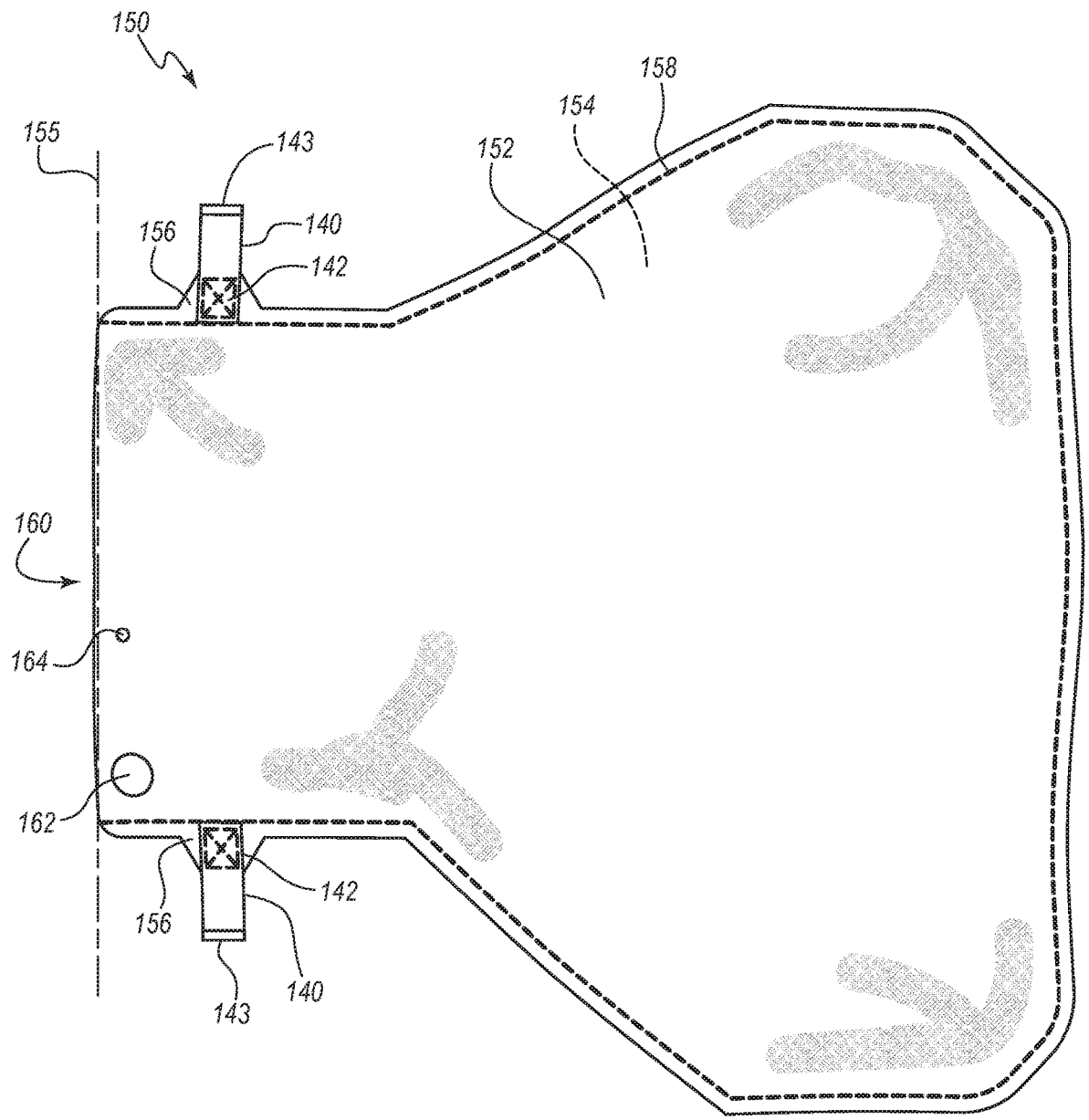
FIG. 5 is a plane view of the inflatable airbag cushion of the airbag assembly of FIGS. 1-4.

FIG. 5 is a plane view of the inflatable airbag cushion 150 of the airbag assembly 100 of FIGS. 1-4. The inflatable airbag cushion 150 may be formed of any suitable fabric, and may be formed of a single, unitary panel of such fabric, or of multiple panels of such fabric. The fabric may be folded, cut, sewn, etc., so as to form an inflatable chamber. The inflatable airbag cushion 150 comprises a first panel 152 and a second panel 154. By way of example without limitation, a panel of suitable fabric may be folded along a midline 155 and coupled together at a panel coupling 158 to form an inflatable chamber. The panel coupling 158 may be a seam. A seam may be formed by sewing, radio-frequency (RF) welding, adhesive, taping, or any suitable method or combination of suitable methods. The inflatable airbag cushion 150 further comprises an inflator region 160 having the inflator aperture 162 and the inflator stud aperture 164. During assembly, the inflator (see 120 in FIG. 3) may be partially inserted through the inflator aperture 162 such that the first inflator stud 123 may be passed through the inflator stud aperture 164.

Each of the tabs 140 may couple at a lateral portion of the inflatable airbag cushion 150 near the inflator region 160. The first end 142 of each tab 140 couples to the inflatable airbag cushion 150 at a tab coupling 156.

Figure 6A:
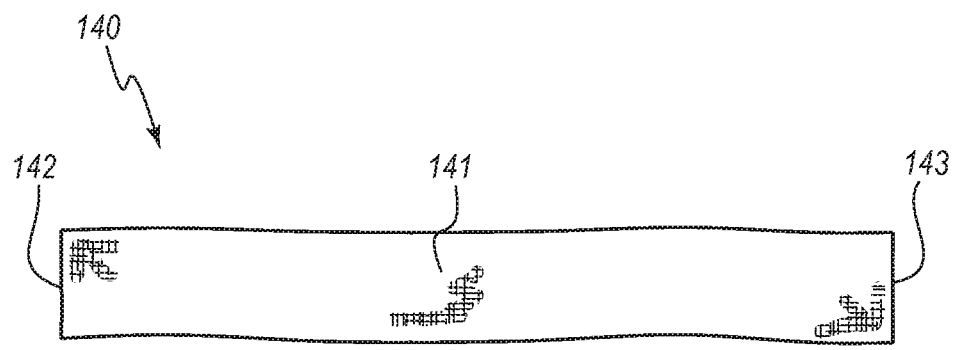
FIG. 6A is a plane view of a tab of the airbag assembly of FIGS. 1-4, according to an embodiment of the present disclosure.

FIGS. 6A-6F illustrate a method of coupling the tabs 140 to the mounting plate 130 and the flexible housing 110. FIG. 6A is a plane view of a tab 140 of the airbag assembly 100 of FIGS. 1-5, according to an embodiment of the present disclosure. Each tab 140 may be formed of a fabric panel 141.

Figure 6B:
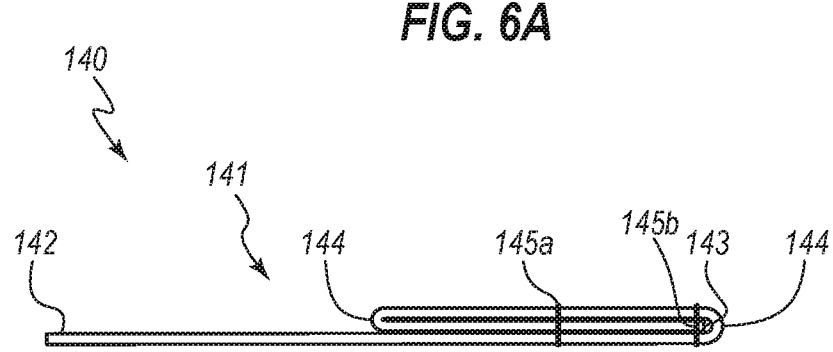
FIG. 6B is a side view of the tab of FIG. 6A, having a plurality of folds proximal to the second end.

FIG. 6B is a side view of the tab 140 having a plurality of folds 144 proximal to the second end 143. Each fold 144 may be secured by a seam 145a, 145b. In other words, the opposing sides of each fold 144 may be coupled together by seams 145a, 145b. More particularly, a central seam 145a may be disposed at a position medial or nearly medial between the folds 144 of the fabric panel 141. An auxiliary seam 145b may be disposed at or near the fold 144 distal to the first end 142 of the fabric panel 141.

Figure 6C:
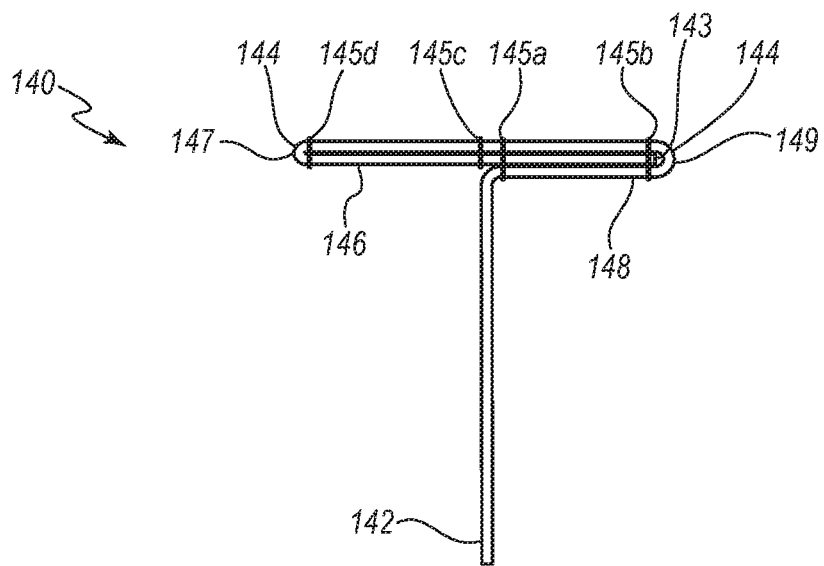
FIG. 6C is a side view of the tab of FIG. 6A, having a plurality of seams that couple the tab together.

FIG. 6C is a side view of the tab 140 with additional auxiliary seams 145c, 145d. The first end 142 of the tab 140 is illustrated disposed orthogonally from the central seam 145a. The auxiliary seam 145c may be disposed adjacent the central seam 145a. Another auxiliary seam 145d may be disposed distal to the auxiliary seam 145b of FIG. 6B.

The plurality of folds 144 and seams 145a, 145b, 145c, 145d may configure the tab 140 to have a first wing 146 disposed to one side of the first end 142, and a second wing 148 disposed to the opposite side of the first end 142. In other words, the tab 140 may comprise the first end 142 and the second end 143, the second end 143 having the first wing 146 and the second wing 148. The first wing 146 has a first thickness 147. The second wing 148 has a second thickness 149. In some embodiments, the first wing 146 has a thickness less than the thickness of the second wing 148.

FIG. 6D is a side view of the tab 140 during assembly to the airbag assembly 100 of FIGS. 1-5. The second wing 148 of the second end 143 of the tab 140 may be passed through the tab slot 138 of the mounting plate 130. In one embodiment, the second wing 148 may be passed through the tab slot 116 of the flexible housing 110. The inflatable airbag cushion (see 150 in FIG. 3) is not shown; however, the first end 142 will have been previously coupled to the inflatable airbag cushion 150. The tab slot 116 of the flexible housing 110 and the tab slot 138 of the mounting plate 130 may each have a dimension to accommodate the second thickness 149 of the second wing 148, but less than the second thickness 149 of the second wing 148 combined with the first thickness 147 of the first wing 146. The second end 143 of the tab 140 may be advanced through the tab slots 116, 138 sufficiently to draw the first wing 146 of the tab 140 through the tab slots 116, 138.

FIG. 6E is a side view of the tab 140 once the airbag assembly 100 of FIGS. 1-5 is mounted to a vehicle (not shown). The second end 143, comprising the first wing 146 and second wing 148, has been drawn through the tab slots 138 and 116 of the mounting plate 130 and flexible housing 110, respectively. The first wing 146 and second wing 148 of the tab 140 may be disposed to opposite sides of the tab slots 138, 116, and may engage an interior surface of the support member 14. As in FIG. 6D, the first end 142 of the tab 140 is coupled to the inflatable airbag cushion (150 in FIG. 3).

FIG. 6F is a side view of the tab 140 in a deployed configuration of the airbag assembly 100 of FIGS. 1-5, according to an embodiment of the present disclosure. With the inflatable airbag cushion (see 150 in FIGS. 3, 9B) deployed, the first end 142 may draw the tab 140 downward. As the tab 140 is drawn downward, the first and second wings 146, 148 are drawn together. Because the tab slots 116, 138 of the flexible housing 110 and mounting plate 130 are narrower than the combination of the first thickness 147 and second thickness 149, the second end 143 of the tab 140 may function as a stopper knot to prevent the tab 140 from pulling through the tab slots 116, 138. This may enable the tabs 140 to assist in disposing the inflatable airbag cushion 150 so as to engage the lower anatomy of an occupant during a collision event.

Figure 7:
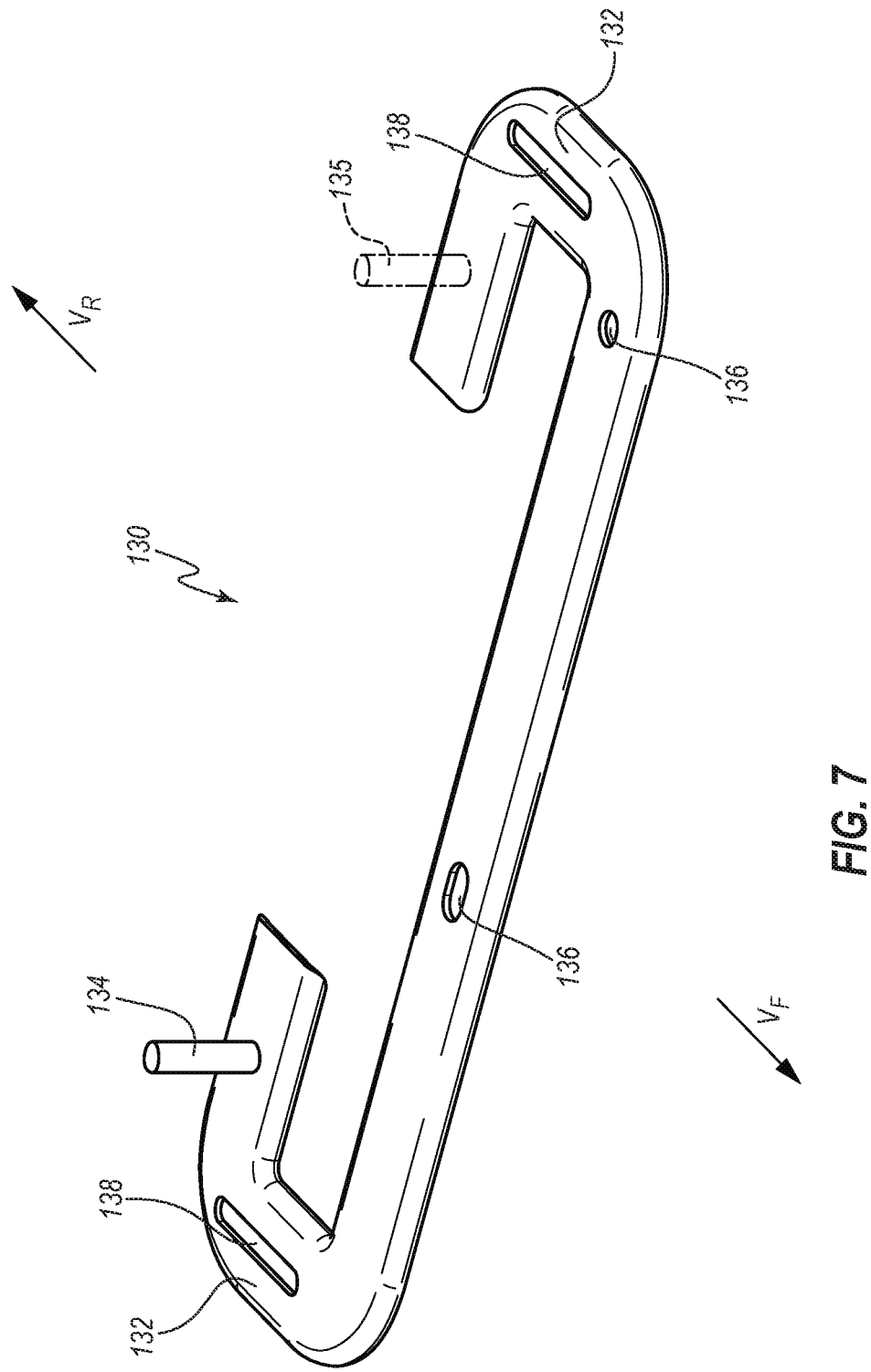
FIG. 7 is a perspective view of the mounting plate of the airbag assembly of FIGS. 1-4, according to an embodiment of the present disclosure.

FIG. 7 is a perspective view of the mounting plate 130 of the airbag assembly 100 of FIGS. 1-4, according to an embodiment of the present disclosure. The mounting plate 130 is an elongate member having a length and width approximately equal to the length and width of the inflatable airbag cushion 150 in a compressed state. The mounting plate 130 may be fabricated from metal, a metal alloy, plastic, or a combination thereof. The mounting plate 130 may be rigid, or generally rigid, so as to support and/or lend form to the assembled airbag assembly 100. The mounting plate 130 may comprise two arms 132 at opposing ends of the elongate member, with each arm 132 oriented transverse to a longitudinal axis of the elongate member. The mounting plate 130 may further comprise at least one mounting stud 134, 135. The mounting plate 130 illustrated in FIG. 3 illustrates a single stud 134. However, the mounting plate 130 may include more, such as mounting stud 135 illustrated in broken lines on FIG. 7. The mounting plate 130 further comprises a tab slot 138 near either opposite end of the elongate member. More particularly, a tab slot 138 may be disposed within each arm 132 and transverse to the elongate dimension of the mounting plate 130. The mounting plate 130 may also comprise two stud apertures 136 to accommodate the inflator studs (see 123, 124 in FIGS. 2-4) and to facilitate mounting the airbag assembly 100 to the airbag assembly receiver of the support member (see 16, 14 in FIGS. 1-2). In some embodiments, the mounting plate 130 may have more or fewer than two stud apertures 136, and the number of stud apertures 136 may correspond with the number of studs of the inflator 120. The mounting plate 130 may provide structure to the airbag assembly and prevent sagging of the airbag assembly after installation in the vehicle.

Figure 8:
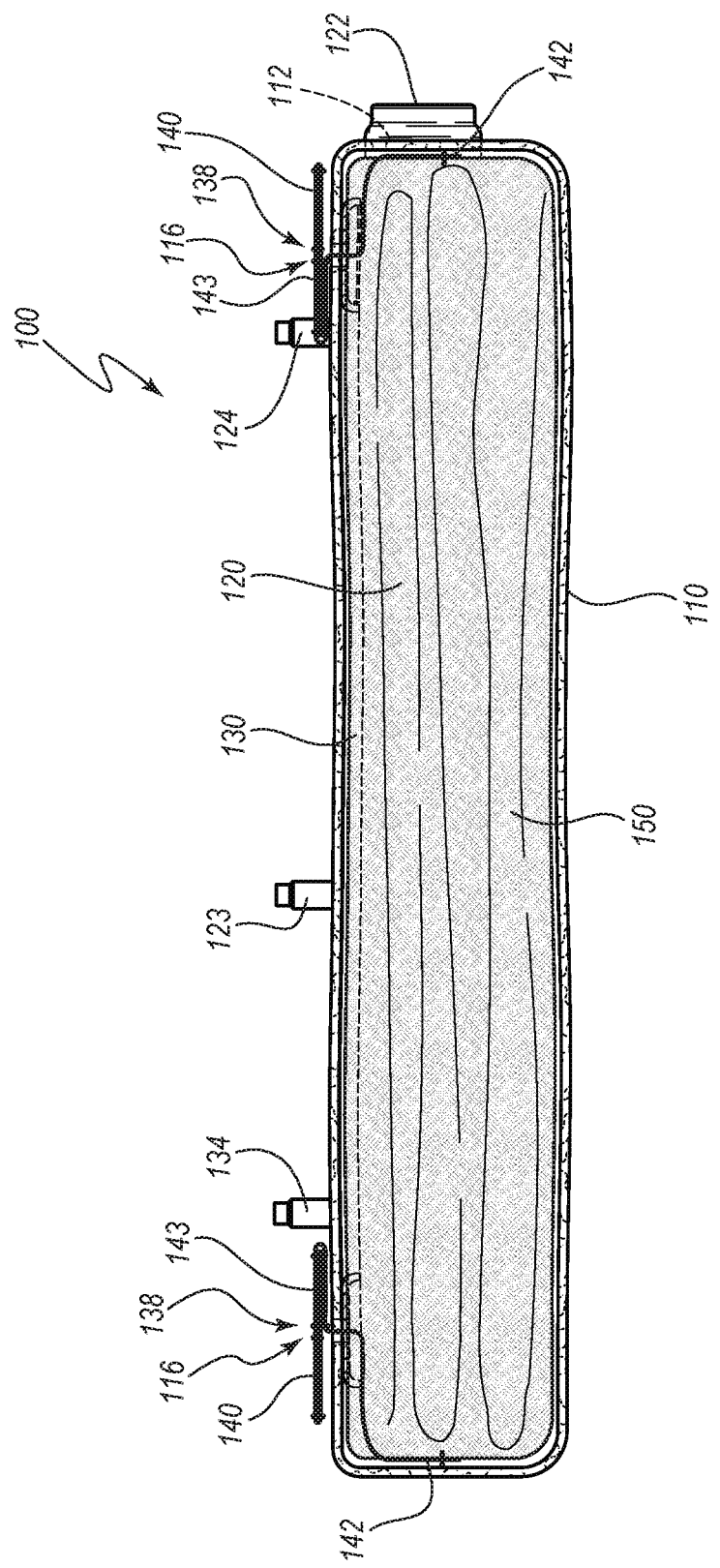
FIG. 8 is a front view of the airbag assembly of FIGS. 1-4 showing the flexible housing in cross-section, according to an embodiment of the present disclosure.

FIG. 8 is a cross-sectional view of the airbag assembly 100 of FIG. 4 taken along line 8-8. The inflatable airbag cushion 150 is shown, along with the inflator 120. The first and second studs 123, 124 of the inflator 120, and the stud 134 of the mounting plate 130 are shown for reference. The flexible housing 110 is disposed closely around the compacted inflatable airbag cushion 150, in which the inflator 120 is partially disposed. The connector end 122 of the inflator 120 is exposed or protrudes through the inflator connector aperture 112 of the flexible housing 110. Two tabs 140 are shown disposed toward opposite ends of the mounting plate 130, hence toward opposite ends of the flexible housing 110 of the airbag assembly 100. The first end 142 of each tab 140 is coupled to the inflatable airbag cushion 150. The second end 143 of each tab 140 has been passed through the tab slots 138, 116 of the mounting plate 130 and flexible housing 110, respectively, and the second end 143 is disposed at an outer portion of the flexible housing 110.

Figure 9A:
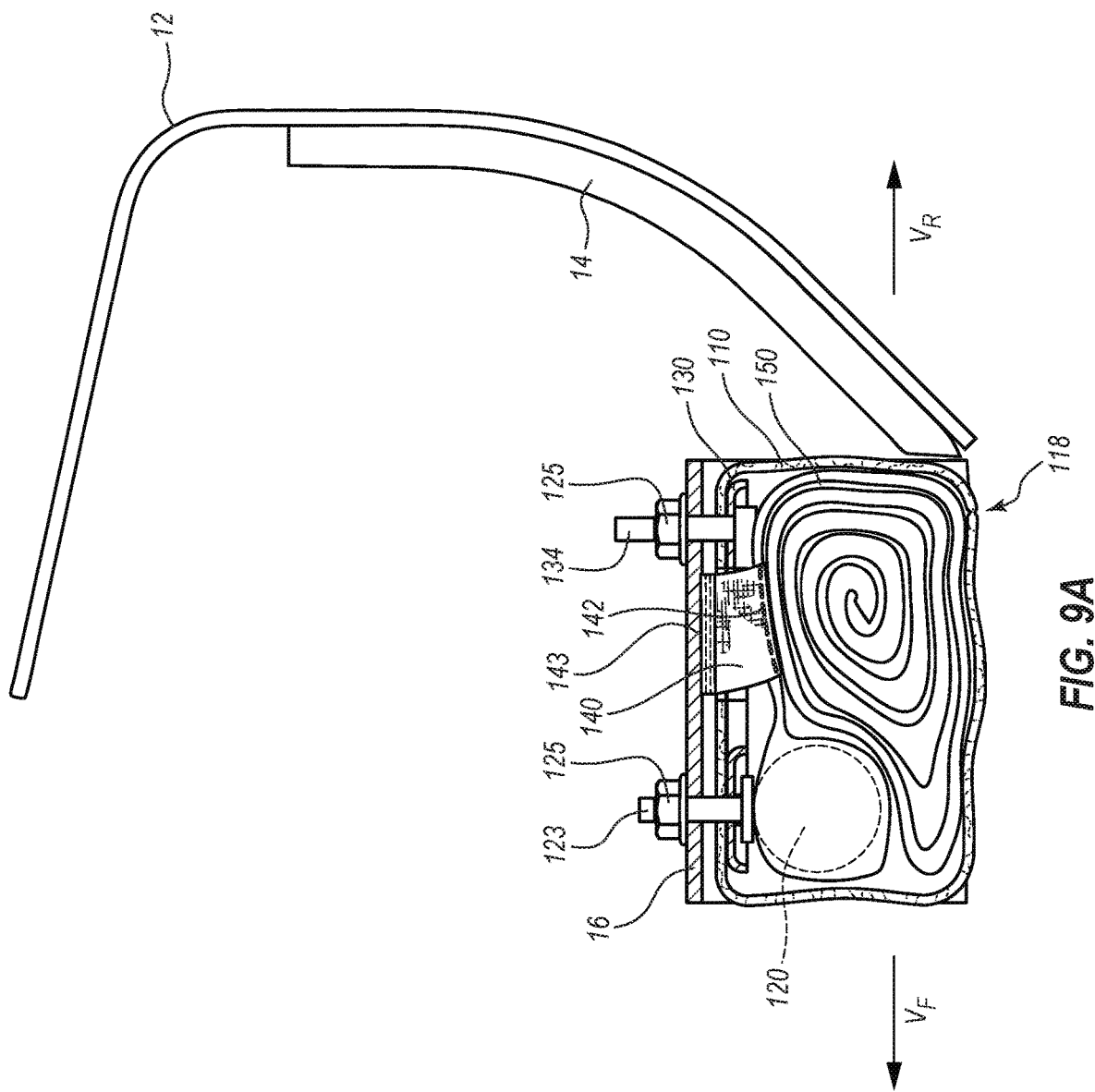
FIG. 9A is a side schematic view of the airbag assembly of FIGS. 1-4, according to an embodiment of the present disclosure, disposed within a vehicle.

FIG. 9A is a side schematic view of the airbag assembly 100, according to an embodiment of the present disclosure, disposed within a vehicle. The instrument panel/dashboard 12 and support member 14 are shown for reference. The airbag assembly 100 is shown coupled to the airbag assembly receiver 16 of the support member 14.

The first stud 123 of the inflator 120 and the stud 134 of the mounting plate 130 couple the airbag assembly 100 to the airbag assembly receiver 16, and are secured in place by securing hardware 125. The second inflator stud (not shown, but see 124 in FIGS. 2-3) similarly couples the airbag assembly 100 to the airbag assembly receiver 16. In other words, at least three attachment studs 123, 124, 134 couple the airbag assembly 100 to the airbag assembly receiver 16 of the support member 14. At least one of the at least three studs 123, 124, 134 may be inflator studs 123, 124. At least one of the at least three studs 123, 124, 134 may be studs 134, 135 of the mounting plate 130. The studs 123, 124, 134 may be secured to the support member 14 via the airbag assembly receiver 16 so as to tightly couple the second end 143 of each tab 140 between the airbag assembly receiver 16 and the flexible housing 110. In other words, the securing hardware 125 may draw the studs 123, 124, 134 and, hence, the mounting plate 130 tightly against the airbag assembly receiver 16 so as to firmly affix the second end 143 of each tab 140 between the airbag assembly receiver 16 and the flexible housing 110.

The flexible housing 110 may comprise a tear bias 118. The tear bias 118 may be formed, for example without limitation, by crimping the flexible housing 110 at the tear bias 118 location prior to the flexible housing 110 being heat-formed to the compressed inflatable airbag cushion 150. The tear bias 118 may permit the flexible housing 110 to tear open or rupture at, near, or along a desired location so as to assist in disposing the inflatable airbag cushion 150 during deployment and inflation.

Figure 9B:
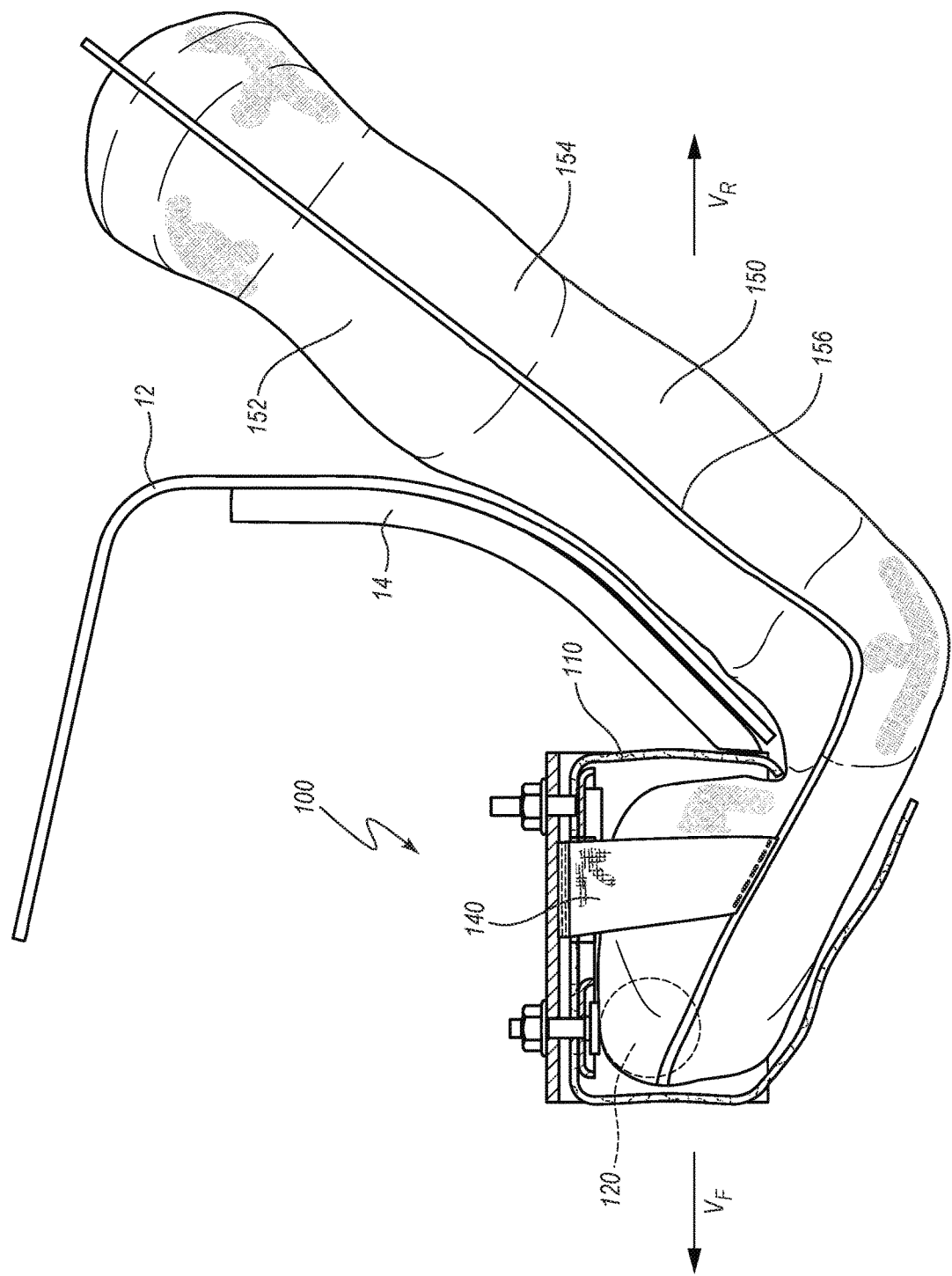
FIG. 9B is a side schematic view of the airbag assembly of FIG. 9A, according to an embodiment of the present disclosure, with the inflatable airbag cushion at least partially deployed.

FIG. 9B is a side schematic view of the airbag assembly 100 of FIG. 9A in an at least partially deployed state, according to an embodiment of the present disclosure. The inflatable airbag cushion 150 comprises a first panel 152 and a second panel 154. The first panel 152 and second panel 154 may be coupled at the panel coupling 156 so as to define an inflatable chamber within the inflatable airbag cushion 150.

The inflator 120 has been activated so as to supply inflation gas into the inflatable airbag cushion 150. As the inflatable airbag cushion 150 begins to inflate, the inflatable airbag cushion 150 may begin to expand (unroll, if rolled; unfold, if folded; etc.). Expansion of the inflatable airbag cushion 150 may cause the flexible housing 110 to rupture. In particular, the flexible housing 110 may rupture along or near the tear bias (118 in FIG. 9A). Continued expansion of the inflatable airbag cushion 150 may cause the inflatable airbag cushion 150 to initially deploy with a downward and rearward trajectory. The inflatable airbag cushion 150 may be configured via folds, seams, etc. (not shown) to cause the inflatable airbag cushion 150 to turn so as to deploy rearward and upward once the inflatable airbag cushion 150 has exited the flexible housing 110. The tabs 140 may assist in properly disposing the inflatable airbag cushion 150 during deployment and inflation.

As the inflatable airbag cushion 150 deploys rearward and upward, the first panel 152 of the inflatable airbag cushion 150 may engage a portion of the instrument panel 12 (and/or dashboard). The instrument panel 12 may be supported by the support member 14. The instrument panel 12 may thus serve as a reaction surface to support the inflatable airbag cushion 150 as the inflatable airbag cushion 150 is engaged by an occupant (not shown). In particular, the inflatable airbag cushion 150 may be disposed during a collision event to receive at least a portion of the lower anatomy (i.e., legs) of an occupant, and to support the portion of the lower anatomy of the occupant during ride down.

The configuration of the airbag assembly 100 with the flexible housing 110 and mounting plate 130 may permit the airbag assembly 100 to be smaller and/or lighter than may be possible with a conventional rigid housing. The flexible housing 110 may provide the inflatable airbag cushion 150 and other components of the airbag assembly 100 protection from the environment in a manner similar to a conventional rigid housing. The mounting plate 130 may provide support to the airbag assembly 100 in an undeployed state and, in particular, to the inflatable airbag cushion 150 during a collision event.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

It will be apparent to those having skill in the art that changes may be made to the details of the above-described embodiments without departing from the underlying principles of the present disclosure. Embodiments of the disclosure in which an exclusive property or privilege is claimed are defined as follows.

The invention claimed is:

1. An airbag assembly comprising:
a flexible housing;
an inflatable airbag cushion disposed within the flexible housing in a compressed configuration;
an inflator to supply inflation gas to the inflatable airbag cushion, the inflator at least partially disposed within the flexible housing; and
a mounting plate coupled to the flexible housing,
wherein the airbag assembly comprises at least three attachment studs configured to couple to a reaction surface of a vehicle, the attachment studs protruding from the mounting plate, and
wherein the inflator comprises two studs of the at least three attachment studs, the two studs extend through apertures in the mounting plate and through the flexible housing and are configured to couple to the reaction surface.

2. The airbag assembly of claim 1, wherein the mounting plate is disposed within the flexible housing.

3. The airbag assembly of claim 1, wherein the at least three attachment studs include at least one stud that is integral to and extends from the mounting plate.

4. The airbag assembly of claim 3, wherein the at least three attachment studs are oriented in the same direction and orthogonal to the mounting plate.

5. The airbag assembly of claim 1, wherein a length and width of the mounting plate substantially extend a length and a width of the airbag cushion in the compressed configuration.

6. The airbag assembly of claim 1, wherein the mounting plate comprises an elongate member and arms disposed at opposing ends of the elongate member, the arms oriented transverse to a longitudinal axis of the elongate member.

7. The airbag assembly of claim 1, wherein the mounting plate is configured to provide structure to the airbag assembly and prevent sagging of the airbag assembly.

8. The airbag assembly of claim 1, further comprising a plurality of tabs that couple to the airbag cushion and to the mounting plate.

9. The airbag assembly of claim 8, wherein a first end of each tab couples to the airbag cushion, and a second end of each tab extends through an aperture of the mounting plate.

10. The airbag assembly of claim 8, wherein the plurality of tabs extend through apertures in the flexible housing.

11. The airbag assembly of claim 1, wherein the mounting plate is fabricated from one or more of a metal, a metal alloy, and a plastic material.

12. The airbag assembly of claim 1, wherein the flexible housing comprises a predefined tear seam, wherein the flexible housing is configured to rupture upon inflation of the airbag cushion by the inflator.

13. The airbag assembly of claim 1, wherein the flexible housing comprises an aperture for a connector end of the inflator to be exposed outside the flexible housing.

14. The airbag assembly of claim 1, wherein the flexible housing comprises ductile fabric material including a plurality of polymeric fibers, at least some of the fibers being fused to one another by heat and pressure to impart a predetermined shape to the airbag assembly.

15. An airbag assembly comprising:
an airbag cushion;
an inflator to supply inflation gas to the airbag cushion, the inflator at least partially disposed within the airbag cushion;
a mounting plate coupled to the airbag cushion; and
a flexible cover wrapped around the airbag cushion, inflator, and mounting plate, the flexible cover formed from ductile fabric material including a plurality of polymeric fibers, at least some of the fibers being fused to one another to impart a predetermined stable shape to the airbag assembly, wherein the airbag assembly comprises a plurality of studs that extend out of the flexible cover and are configured to couple to a reaction surface of a vehicle, and wherein the mounting plate comprises apertures to receive T-tabs.

16. The airbag assembly of claim 15, wherein the mounting plate comprises:

an elongate member that extends substantially a length of the flexible cover; and arms disposed at opposing ends of the elongate member, the arms extending substantially a width of the flexible cover and oriented transverse to a longitudinal axis of the elongate member.

* * * * *